(12) United States Patent
Vergara et al.

(10) Patent No.: US 7,357,315 B2
(45) Date of Patent: Apr. 15, 2008

(54) CUSTOMER INTERACTION CONSOLE AND CONFIGURABLE CONSOLE SYSTEM

(75) Inventors: Alexander Vergara, Concord, NH (US); Harold Turner, Goffstown, NH (US)

(73) Assignee: Advantage Branch & Office Systems, LLC, Concord, NH (US)

( * ) Notice: Subject to any disclaimer, the term of this patent is extended or adjusted under 35 U.S.C. 154(b) by 0 days.

(21) Appl. No.: 11/224,724

(22) Filed: Sep. 12, 2005

(65) Prior Publication Data

US 2006/0054685 A1     Mar. 16, 2006

Related U.S. Application Data

(60) Provisional application No. 60/608,821, filed on Sep. 10, 2004.

(51) Int. Cl.
| | |
|---|---|
| G06K 15/00 | (2006.01) |
| G07F 19/00 | (2006.01) |
| G06Q 20/00 | (2006.01) |
| G06Q 40/00 | (2006.01) |
| A63F 9/02 | (2006.01) |

(52) U.S. Cl. .................... 235/383; 235/379; 705/16; 705/35; 186/37; 186/59

(58) Field of Classification Search .......... 25/379, 25/380; 235/379–383; 705/16, 35, 42, 43; 186/37, 59
See application file for complete search history.

(56) References Cited

U.S. PATENT DOCUMENTS

| | | |
|---|---|---|
| 439,989 A | 11/1890 | Whiteley |
| 948,480 A | 2/1910 | Myers et al. |
| 2,666,210 A | 1/1954 | Wiley |
| 2,672,921 A | 3/1954 | Herrick |
| 2,705,994 A | 4/1955 | Stattler |
| 3,004,792 A | 10/1961 | Bell |
| 3,330,596 A | 7/1967 | Wells et al. |
| 3,511,533 A | 5/1970 | Drabert |
| 3,530,954 A | 9/1970 | Schmidt |

(Continued)

FOREIGN PATENT DOCUMENTS

CH     675194     9/1990

(Continued)

OTHER PUBLICATIONS

Articles and photographs disclosing Intellerline system (believed to be prior art) exact date unknown (6 pgs).

(Continued)

*Primary Examiner*—Thien M. Le
*Assistant Examiner*—April Taylor
(74) *Attorney, Agent, or Firm*—Grossman Tucker Perreault & Pfleger, PLLC

(57) ABSTRACT

A customer interaction console may include a counter module and a customer-oriented display. The counter module may include one or more raised portions with the customer-oriented display integrated in one of the raised portions. A configurable console system may include a plurality of customer interaction consoles and a plurality of panel assemblies that may be positioned between consoles. The panel assemblies may include a panel and a wedge portion that receives the panel. The wedge portion may angle the console relative to the panel and to an adjacent consol to form different configurations.

18 Claims, 6 Drawing Sheets

U.S. PATENT DOCUMENTS

| | | | |
|---|---|---|---|
| 4,198,094 | A | 4/1980 | Bjerknes et al. |
| 4,521,052 | A | 6/1985 | Cone |
| 4,534,590 | A | 8/1985 | Yamamura et al. |
| 4,552,404 | A | 11/1985 | Congleton |
| 4,580,040 | A * | 4/1986 | Granzow et al. ........... 235/379 |
| 4,614,378 | A | 9/1986 | Picou |
| 4,682,818 | A | 7/1987 | Morell |
| 4,696,516 | A | 9/1987 | Yeum |
| 4,736,982 | A | 4/1988 | Hwang |
| 4,753,480 | A | 6/1988 | Morell |
| 4,793,655 | A | 12/1988 | Kvalheim |
| 4,832,407 | A | 5/1989 | Serber |
| 4,934,303 | A | 6/1990 | Lathers et al. |
| 5,048,893 | A | 9/1991 | Cowan et al. |
| 5,054,857 | A | 10/1991 | Kvalheim |
| 5,149,174 | A | 9/1992 | Charash |
| 5,154,472 | A | 10/1992 | Kaufman |
| 5,189,747 | A | 3/1993 | Mundy et al. |
| 5,199,763 | A | 4/1993 | Wilder et al. |
| 5,255,957 | A | 10/1993 | Opsvik et al. |
| 5,267,149 | A * | 11/1993 | Anada et al. ................ 705/44 |
| 5,295,728 | A | 3/1994 | Schaevitz |
| 5,542,746 | A | 8/1996 | Bujaryn |
| 5,602,933 | A | 2/1997 | Blackwell et al. |
| 5,606,496 | A * | 2/1997 | D'Agostino ................ 396/235 |
| 5,619,949 | A | 4/1997 | Dick, Jr. |
| 5,630,648 | A | 5/1997 | Allard et al. |
| 5,658,047 | A | 8/1997 | Ratza et al. |
| 5,667,278 | A | 9/1997 | Li |
| 5,857,747 | A | 1/1999 | Mundkowski |
| 5,970,888 | A * | 10/1999 | Sheppard .................... 109/10 |
| 6,089,669 | A | 7/2000 | Wilcox et al. |
| 6,109,694 | A | 8/2000 | Kurtz |
| 6,116,682 | A | 9/2000 | Baur |
| 6,286,758 | B1 * | 9/2001 | Dejaeger et al. ............ 235/383 |
| 6,431,649 | B1 | 8/2002 | Hensel |
| 6,464,300 | B2 | 10/2002 | Grove |
| 6,554,353 | B1 | 4/2003 | Yu |
| 6,578,918 | B1 | 6/2003 | Rinne et al. |
| 6,578,919 | B2 | 6/2003 | Seibold et al. |
| 6,629,636 | B1 * | 10/2003 | Hayashi et al. ............. 235/383 |
| 6,663,174 | B2 | 12/2003 | Drage et al. |
| 6,681,985 | B1 | 1/2004 | Curtin et al. ............... 235/379 |
| 6,733,083 | B1 | 5/2004 | Landvik et al. |
| 6,783,179 | B2 | 8/2004 | Komura et al. |
| 6,824,149 | B1 | 11/2004 | Whitlock et al. |
| 7,090,303 | B2 | 8/2006 | Kropa |
| 2001/0007332 | A1 | 7/2001 | Kjonaas et al. |
| 2003/0151288 | A1 | 8/2003 | Deisig |
| 2005/0060218 | A1 | 3/2005 | Coutts et al. |
| 2005/0240515 | A1 | 10/2005 | Fenstermaker |
| 2005/0246252 | A1 | 11/2005 | Wallace et al. |
| 2005/0263590 | A1 * | 12/2005 | Branck et al. .............. 235/383 |
| 2006/0004660 | A1 * | 1/2006 | Pranger ....................... 705/43 |

FOREIGN PATENT DOCUMENTS

| | | |
|---|---|---|
| DE | 3400136 | 7/1985 |
| DE | 3933815 | 4/1991 |
| DE | 4132280 | 4/1993 |
| DE | 4306918 | 9/1994 |
| EP | 0179748 | 4/1986 |
| GB | 2176396 | 12/1986 |
| WO | 8804903 | 7/1988 |
| WO | 8906101 | 7/1989 |
| WO | 9221270 | 12/1992 |
| WO | 9401050 | 1/1994 |

OTHER PUBLICATIONS

U.S. Office Action Summary dated Feb. 3, 2007 received in U.S. Appl. No. 11/224,725 (10 pages).

U.S. Office Action Summary dated Nov. 20, 2006 received in U.S. Appl. No. 11/224,698 (14 pages).

International Search Report with Written Opinion dated Nov. 2, 2006 received in International Patent Application Serial No. PCT/US05/32665 (12 pages).

\* cited by examiner

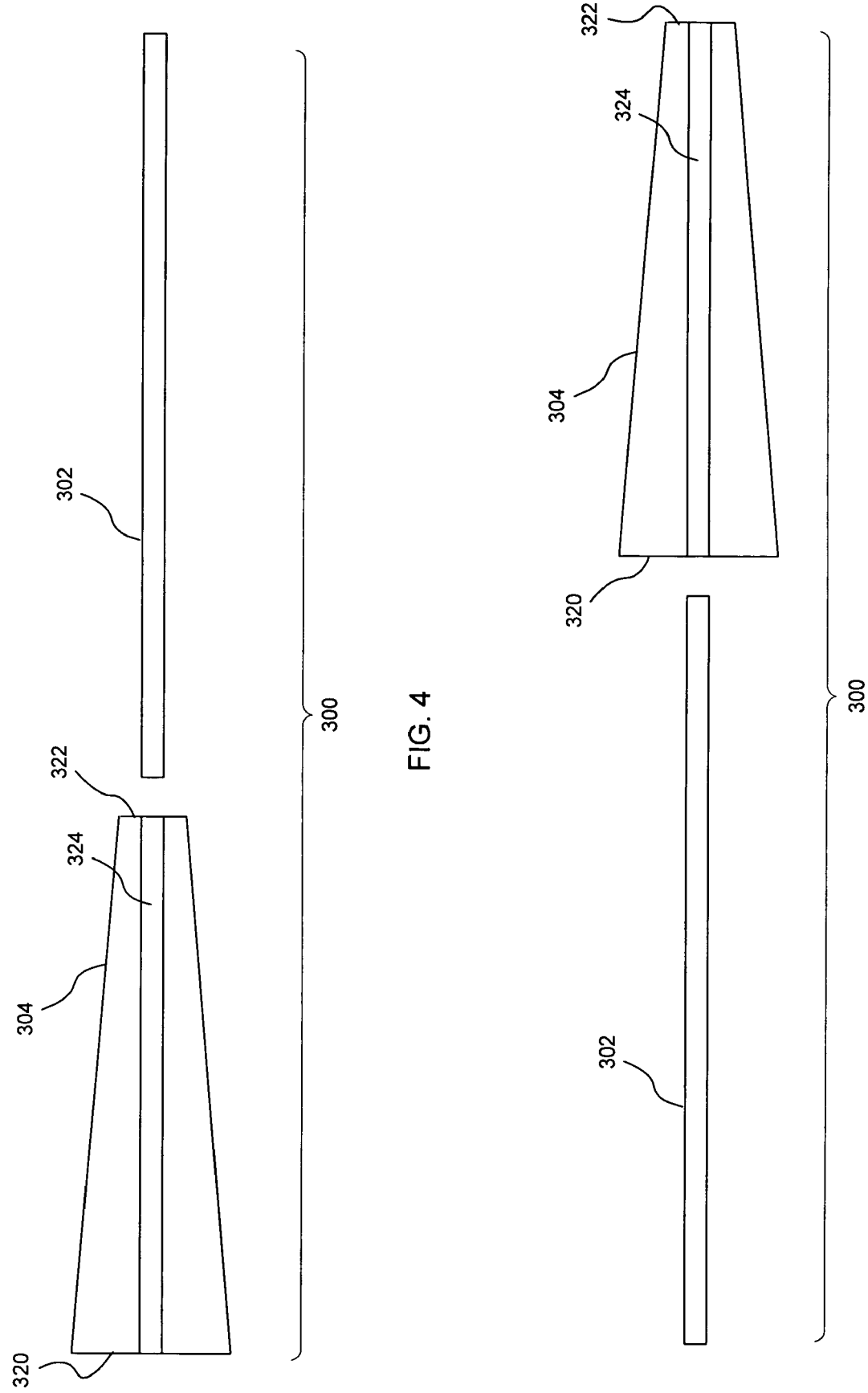

CUSTOMER INTERACTION CONSOLE AND CONFIGURABLE CONSOLE SYSTEM

CROSS-REFERENCE TO RELATED APPLICATIONS

This application claims the benefit of U.S. Provisional Patent Application Ser. No. 60/608,821, filed on Sep. 10, 2004, which is fully incorporated herein by reference. This application is also related to co-pending U.S. patent application Ser. No. 11/224,698 entitled CUSTOMER INTERACTION PROCESS AND SYSTEM and U.S. patent application Ser. No. 11/224,725 entitled MULTI-POSITION CHAIR, both of which are filed concurrently herewith and are fully incorporated herein by reference.

TECHNICAL FIELD

The present invention relates to office systems and customer interaction and more particularly, to a customer interaction console and a configurable console system.

BACKGROUND INFORMATION

A successful business may depend on the office environment in which the business' employees work and in which customers interact with the business. Employees are generally more productive in a safe and comfortable workplace and in a rewarding job. Customers are generally more satisfied when interacting with pleasant employees in an efficient and customer-friendly manner. Existing office environments and processes for customer interaction have some shortcomings that result in unhappy employees and unhappy customers and as a result, a less successful business.

In a branch office of a bank, for example, the traditional customer interaction process and the traditional office environment have some shortcomings. For basic banking transactions (e.g., deposits and withdrawals), the customer meets with a teller who is generally trained only to perform these basic banking transactions. Traditional bank tellers at a traditional teller console have limited access to information for customers and a limited ability to provide additional services to the customer. For customer service and purchasing additional bank products, the customer generally meets with a separate customer service representative or other bank worker at a different location within the bank. For marketing materials, the customer may be presented with pre-printed brochures positioned at various locations within the bank.

The traditional office environment is often uncomfortable for the workers and in some cases, may cause work-related disorders or injuries. The teller's console in a bank office, for example, may not allow the teller to work comfortably and effectively. Working in confined spaces where the number of physical positions available to the worker is restricted may lead to musculoskeletal disorder (MSD). Such injuries or disorders may lead to job dissatisfaction, absenteeism and worker's compensation claims. Existing consoles used by bank tellers generally have a limited number of configurations.

The existing console arrangement also may not provide the customer with adequate privacy. When the teller provides the customer with sensitive information involving the customer's account, for example, that information may be overheard by other customers. Federal laws require banks to protect consumer's financial private information from unauthorized access.

BRIEF DESCRIPTION OF THE DRAWINGS

These and other features and advantages will be better understood by reading the following detailed description, taken together with the drawings wherein:

FIG. 4 is an exploded view of a wedge portion and a privacy panel configured to be inserted into one side of the wedge portion, consistent with one embodiment of the present invention.

FIG. 5 is an exploded view of a wedge portion and a privacy panel configured to be inserted into another side of the wedge portion, consistent with another embodiment of the present invention.

DETAILED DESCRIPTION

Figure 1:
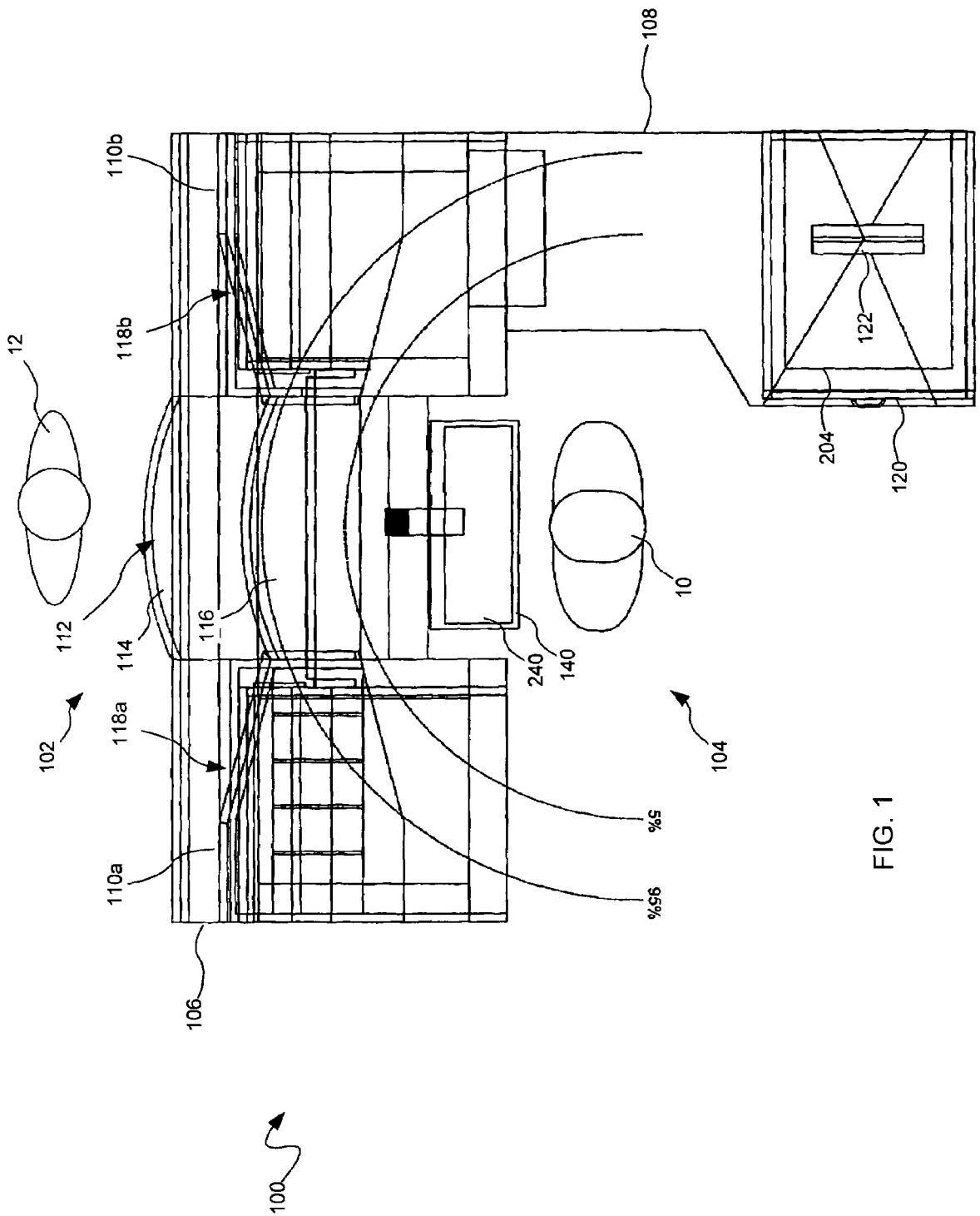
FIG. 1 is a top view of a customer interaction console, consistent with one embodiment of the present invention.
Figure 2:
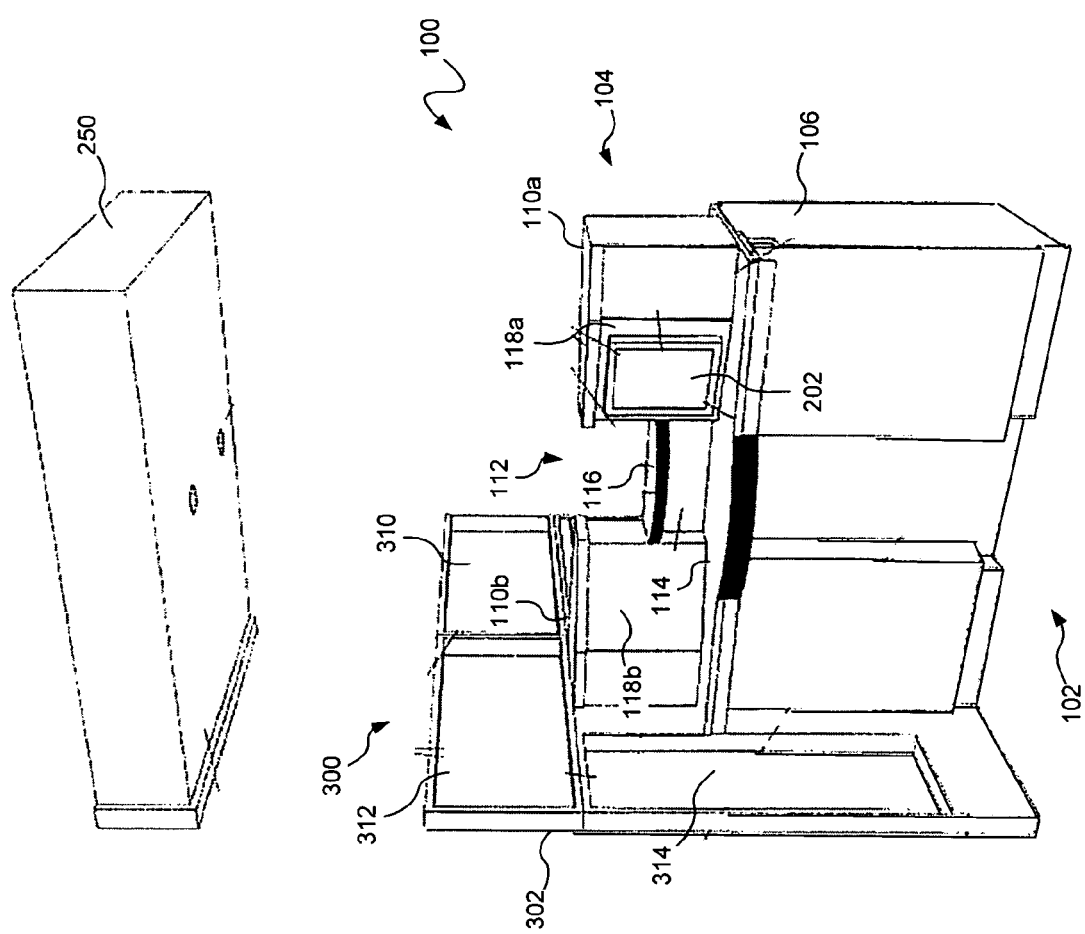
FIG. 2 is a front perspective view of another embodiment of a customer interaction console.
Figure 3:
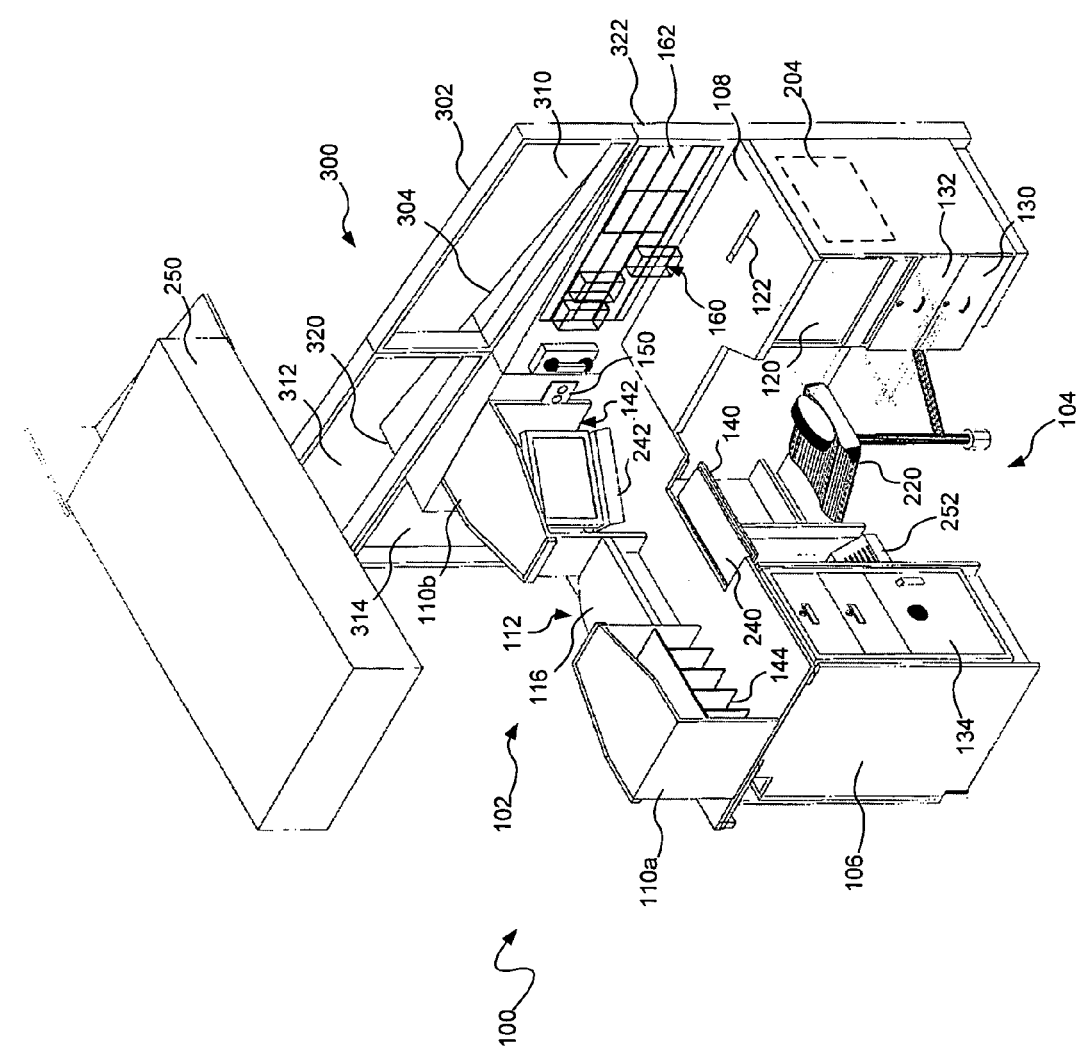
FIG. 3 is a rear perspective view of a further embodiment of a customer interaction console.

Referring to FIGS. 1-3, embodiments of a customer interaction console 100 are described in detail. In general, the customer interaction console 100 may be configured to provide a comfortable and efficient workspace for a worker and to provide customer privacy. A configurable customer interaction console system may include multiple customer consoles 100, which may be configured in various arrangements in an office environment. In one application, the customer interaction console 100 and/or console system may be used in a customer interaction process and system (e.g., in a bank or other such financial institution) such as the type disclosed in co-pending U.S. patent application Ser. No. 11/224,698 filed concurrently herewith and fully incorporated herein by reference.

The customer interaction console 100 generally has a customer side 102 (shown in FIG. 2) and a worker side 104 (shown in FIG. 3). The customer interaction console 100 may include a counter module 106 and a side or return module 108. A customer 12 may stand at a customer's location on the customer side 102 of the counter module 106. The return module 108 may extend generally perpendicular from either side of the counter module 106 (shown in FIGS. 2-3 on the worker's right hand side). The customer interaction console 100 may also include return modules 108 on both sides (not shown) of the counter module 106.

The counter module 106 may include raised counter portions 110a, 110b on either side of a customer interaction area 112 at the customer's location. The counter module 106 may also include a lower customer counter surface 114 and a higher customer counter surface 116 between the raised counter portions 110a, 110b. In the customer interaction area 112, the lower customer counter surface 114 and the higher customer counter surface 116 may have rounded edges. The counter module 106 may include a light source (not shown), such as a low voltage light source, under the front edge of the higher customer counter surface 116. The lower customer counter surface 114 may also extend in front of the raised counter portions 110a, 110b. The raised counter portions 110a, 110b may have angled surfaces 118a, 118b angled inwardly toward the customer interaction area 112.

In one example, the counter module 106 may have a width of about 5 feet to 6 feet and a depth of about 2 feet 6 inches. The raised counter portions 110a, 110b may each have a width of about 2 feet and the customer interaction area 112 may be centrally located with a width of about 2 feet. The lower customer counter surface 114 may have a height of about 3 feet 4 inches from the ground and the raised counter portions 110a, 110b may have a height of about 4 feet 10 inches from the ground. An exemplary return module 108 may extend about 3 feet 6 inches from the counter module 106 and may have a width of about 1 foot 6 inches. Although the exemplary customer interaction console 100 is shown and described with specific dimensions, those skilled in the art will recognize that the customer interaction console may have different dimensions, shapes and configurations.

According to one embodiment, the customer interaction console 100 may include an integrated customer-oriented display 202 (FIG. 2). The customer-oriented display 202 may be incorporated in one of the raised counter portions 110a, 110b, for example, in one of the angled surfaces 118a, 118b, such that the customer-oriented display 202 is angled toward a customer location. Angling of the customer-oriented display 202 allows information to be displayed privately to the customer.

According to one application, the customer-oriented display 202 may be configured to privately display information to the customer including, but not limited to, teller name and deposit policy, special product offers, advertising for local businesses, customer account information, dynamic and static messages, and other marketing information. One example of a customer-oriented display is a 15 in. flat screen LED monitor such as the type available from Samsung Electronics under the name SyncMaster. The customer-oriented display 202 located at the customer interaction console 100 may be connected to the teller's computer to allow the teller to control information to be displayed to the customer.

According to one embodiment, the customer interaction console 100 may include an integrated printer 204. The return module 108 may include a sliding tray 120 for housing the printer 204 and slot 122 for allowing printed materials to be retrieved by a worker. The sliding tray 120 allows maintenance access to the printer 204.

According to one application, the printer 204 may be configured to provide on demand printing of materials for the customer including, but not limited to, two-sided color brochures (e.g., with real time rate information), customer specific account information, forms for opening new accounts, special offers, and other marketing materials. Thus, information addressing a specific customer request or need may be efficiently and conveniently printed and provided to the customer at the teller station. On demand printing allows the bank to save on the printing of collateral materials. One example of a printer that may be used for on demand printing is a laser duplex printer capable of providing two sided color brochures, such as the type available from Oki Data under the name OKI C5400.

According to one embodiment, the customer interaction console 100 may also include an integrated chair 220, for example, coupled to the counter module 106 or to the return module 108 (FIG. 3). The chair 220 may be pivotably mounted to the console 100 allowing the chair 220 to be moved to a storage position, for example, beneath the counter module 106 or the return module 108. One example of the chair 220 is a multi-position chair described in greater detail in co-pending U.S. patent application Ser. No. 11/224,725, which is filed concurrently herewith and fully incorporated herein by reference.

The customer interaction console 100 may also include other optional features. The customer interaction console 100 may include one or more drawers 130, 132 in the counter module 106 and/or the return module 108. The customer interaction console 100 may also include undercounter steel 134. Alternatively, the customer interaction console 100 may include cash dispensing systems instead of typical undercounter steel, for example, to eliminate tedious and monotonous routines and to improve transaction times. Software may be used to track the cash usage and a head teller (or other bank worker) can be notified when a station has cash needs prior to requiring a vault call, thereby avoiding wasting the customer's time.

The customer interaction console 100 may also include an articulating keyboard tray 140 for holding a computer keyboard 240 and a recessed corner area 142 (e.g., under raised counter portion 110b) for accommodating a flat panel monitor 242. The customer interaction console 100 may further include storage and/or organizers 144, for example, under the other raised counter portion 110a. The customer interaction console 100 may further include individual light and heater controls 150 for controlling lights 250 and a heater 252 associated with the individual customer interaction console 100. The customer interaction console 100 may also include one or more forms/documents holders 160 for holding forms and/or documents. The light and heater controls 150 and the forms/documents holders 160 may be located on a side surface 162 adjacent to the return module 108, for example, on a privacy panel or wedge portion discussed below.

The customer interaction console 100 discussed above may be designed based on the teller's individual needs relative to temperature, lighting, noise factors, humidity, air quality, and physical accommodations. The customer interaction console 100 may also be designed based on other ergonomic variables such as workplace height, computer placement (keyboard and monitor), seating, and placement of teller cash drawers and forms and other frequently accessed items. The customer interaction console 100 may be customizable to accommodate these different considerations.

According to one method of interacting with a customer 12 at the customer interaction console 100, customer information (e.g., account information) may be displayed to a worker 10 on the worker side display 242 and to a customer 12 on the customer-oriented display 202. marketing or advertising information may also be displayed to the customer on the customer-oriented display 202. Documents such as customer account information (e.g., account statements), marketing material (e.g., brochures), and forms may be printed for the customer 12, for example, using the printer 204 on the worker side 104 of the console 100.

A privacy panel assembly 300 may be positioned between one or more of the customer interaction consoles 100 to provide privacy and to form a configurable console system. The privacy panel assembly 300 may include a privacy panel 302 with or without a wedge portion 304. The privacy panel 302 may extend beyond the customer side 102 of the console 100 and above the console 100 to prevent the voices of the employees and/or customers from carrying over to an adjacent customer transaction location. The privacy panels 302 may include one or more glass panels 310, 312, 314, such as ¼ inch safety glass, to allow light to flow through.

The wedge portions 304 may be used to allow the customer interaction console system to be arranged in various configurations, as described below. The wedge portions 304 generally include a wider end 320 and a narrower end 322 that is narrower than the wider end 320. The wedge portions 304 may be used to angle the consoles 100 with respect to the panels 302 and with respect to adjacent consoles 100. The panels 302 may be removably attached to the wedge portions 304 such that the panels 302 may be positioned between the consoles 100 with or without the wedge portions 304 to form different configurations.

According to one embodiment, shown in FIGS. 4 and 5, each wedge portion 304 may have a slot 324 capable of receiving one of the panels 302. The panels 302 and/or wedge portions 304 may include a tracking system to provide alignment. One example of a tracking system includes one or more protruding members (not shown) on the panel 302 and/or the wedge portion 304 extending into one or more tracks (not shown) running along the panel 302 and/or the wedge portion 304.

In a further embodiment, the wedge portions 304 may be configured to receive the panels 302 from either end 320, 322 of the wedge portions 304. This allows different orientations of the wedge portions 304 relative to the consoles and thus allows different configurations (as shown, for example, in FIG. 8). The slots 324 in the wedge portions 304, for example, may extend from one end 320 to the other end 322 of the wedge portion 304. The panel 302 may be inserted into and extend from the narrower end 322 in one orientation (FIG. 4). The panel 302 may be inserted into and extend from the wider end 320 in another orientation (FIG. 5).

Figure 6:
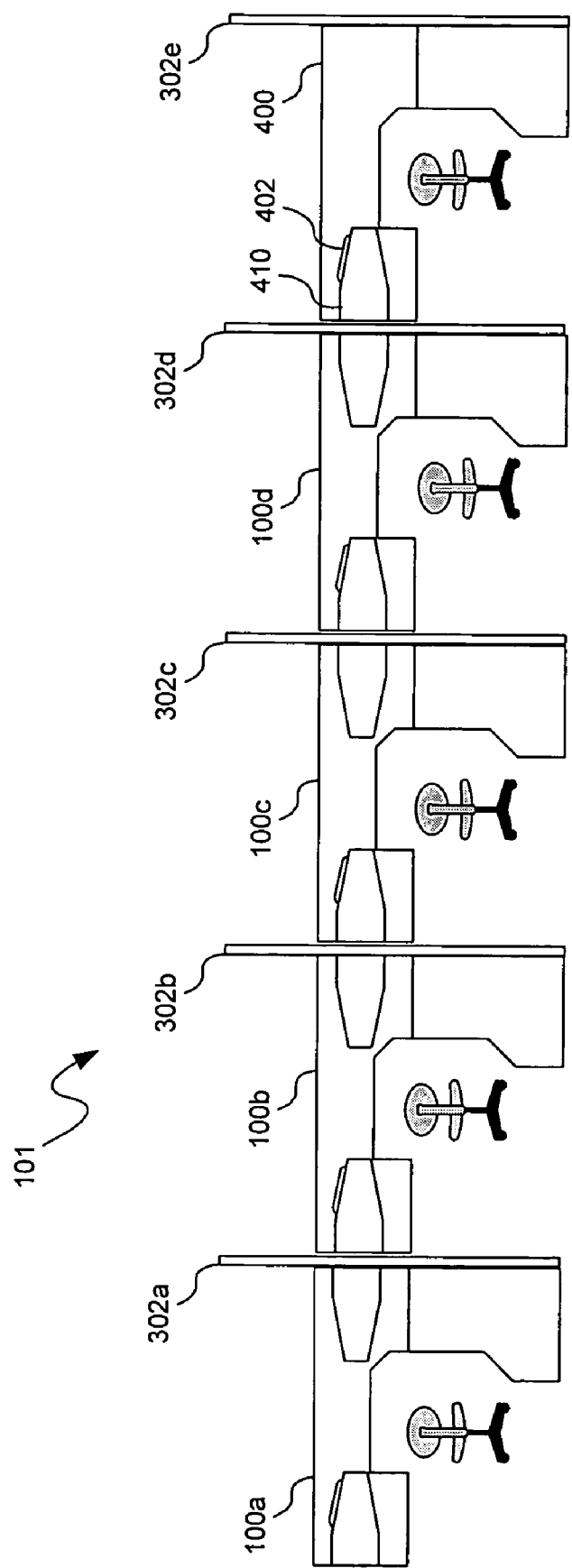
FIG. 6 is a top plan view a configurable console system including a plurality of customer interaction consoles arranged in one configuration, consistent with one embodiment of the present invention.
Figure 7:
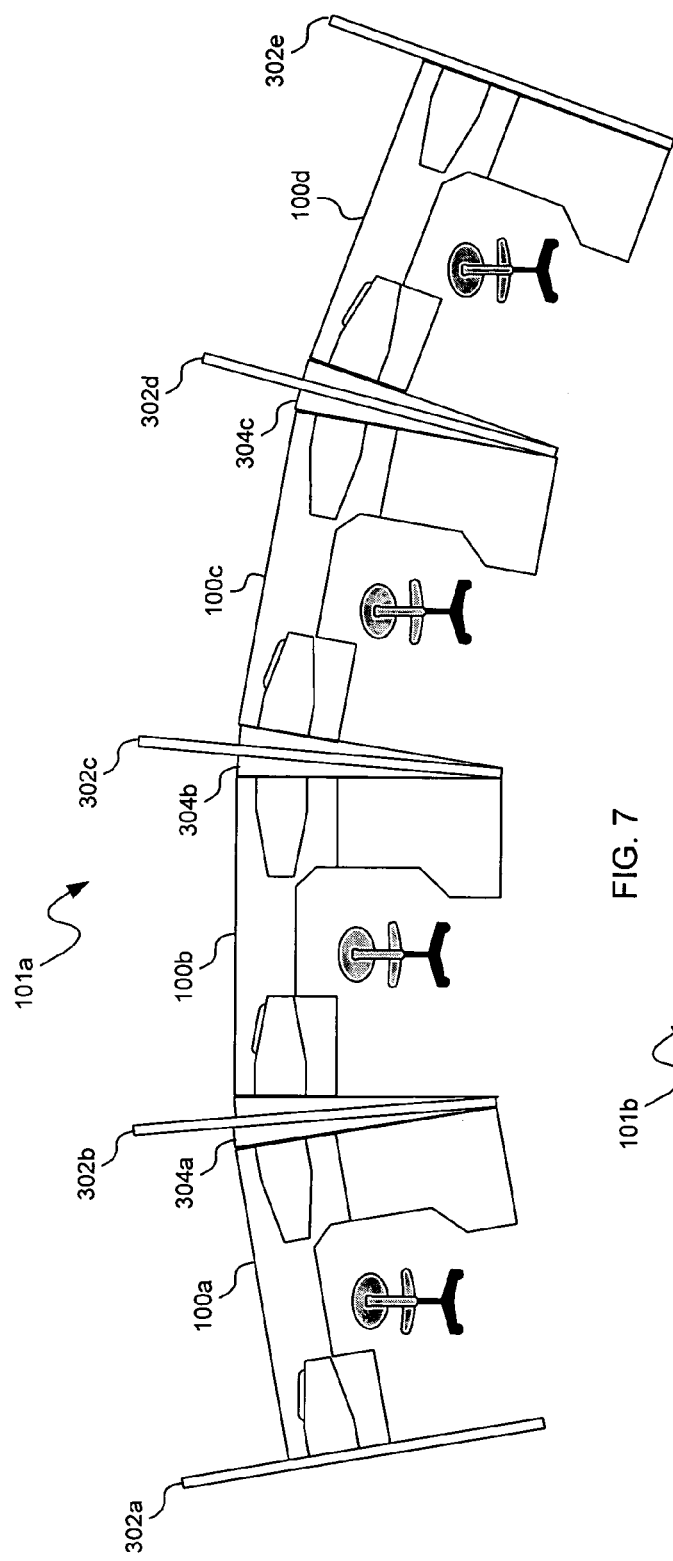
FIG. 7 is a top plan view of a configurable console system including a plurality of customer interaction consoles arranged in another configuration, consistent with another embodiment of the present invention.
Figure 8:
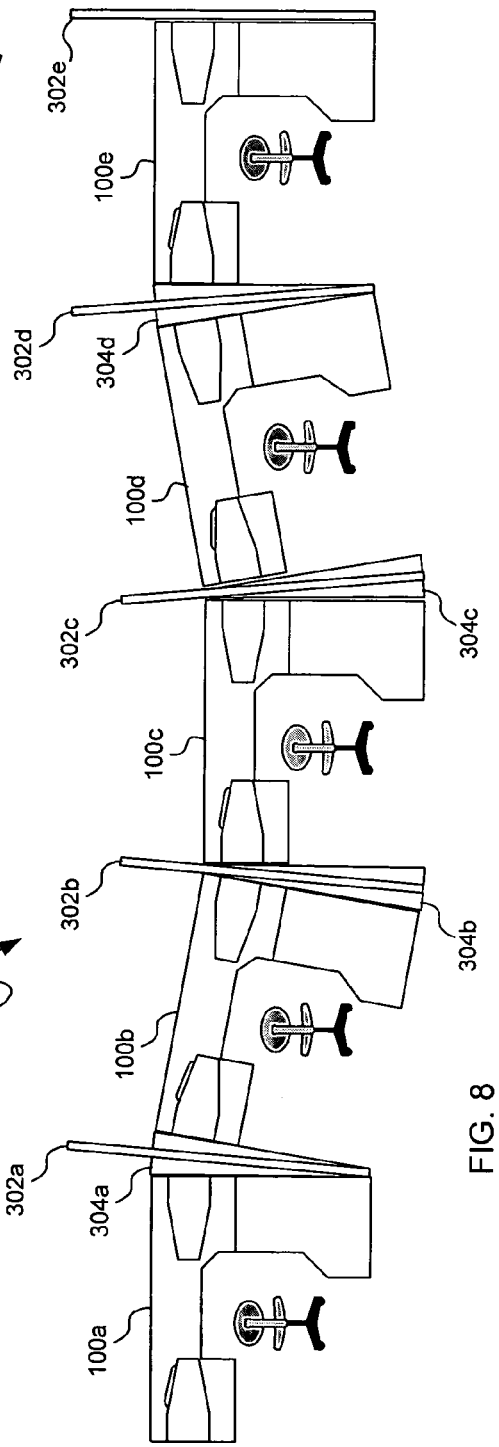
FIG. 8 is a top plan view of a configurable console system including a plurality of customer interaction consoles arranged in a further configuration, consistent with a further embodiment of the present invention.

Referring to FIGS. 6-8, configurable console systems 101, 101a, 101b may be formed using a combination of one or more consoles 100, panels 302, and wedge portions 304. The consoles 100 may be positioned adjacent one another with or without the panels 302 and/or wedge portions 304. Configurable console systems may also include desk modules positioned adjacent the consoles 100 with or without the panels 302 and the wedge portions.

According to one embodiment of the configurable console system 101, consoles 100a-100d and panels 302a-302e may be assembled to form a straight configuration (FIG. 6). In this configuration, the panels 302a-302e are positioned between the consoles 100a-100d without wedge portions 304. This embodiment of the configurable console system 101 also includes desk module 400. One embodiment of the desk module 400 may be similar to the customer interaction console 100, except at a lower height and with only one raised counter portion 410. The raised counter portion 410 may include a customer-oriented display 402, as described above. Alternatively, the desk module 400 may include an adjustable support arm holding a customer-oriented display (not shown).

According to another embodiment of the configurable console system 101a, consoles 100a-100d, panels 302a-302e and wedge portions 304a-304c may be assembled to form a curved configuration (FIG. 7). In this configuration, the wedge portions 304a-304c have the same general orientation relative to the consoles 100a-100d (i.e., the wider ends of the wedge portions 304a-304c are facing toward the customer side).

According to a further embodiment of the configurable console system 101b, consoles 100a-100e, panels 302a-302e and wedge portions 304a-304d may be assembled to form a serpentine configuration (FIG. 8). In this configuration, some of the wedge portions 304a, 304d have a different orientation than other wedge portions 304b, 304c to create the different angles resulting in the serpentine configuration.

Any number of consoles 100 and/or desk modules 400 may be positioned together with or without panels 302 and wedge portions 304 to create numerous different configurations. Although specific configurations are shown, those skilled in the art will recognize that many other configurations are possible using this modular configurable system.

In summary, a customer interaction console system, consistent with one embodiment of the invention, includes one or more counter modules including a worker side and a customer side and first and second panels located on each side of the counter module. A customer-oriented display may be mounted to the counter module between the panels and facing the customer side of the counter module. The customer-oriented display may be angled to display information to a customer location at the counter module.

A configurable customer interaction console system, consistent with another embodiment of the invention, includes a plurality of counter modules, a plurality of panels configured to be positioned between the counter modules, and a plurality of wedge portions configured to receive the panels at either end of the wedge portions. The wedge portions are configured to be positioned between at least some of the counter modules in a plurality of configurations.

A customer interaction console, consistent with a further embodiment of the present invention, includes a counter module having a worker side and a customer side and a return module extending from the counter module. The counter module may include a customer interaction area and raised counter portions on each side of the customer interaction area with at least one of the raised counter portions including an angled surface angled inward toward the customer interaction area. A customer-oriented display may be integrated with the angled surface of one of the raised counter portions.

Consistent with yet another embodiment of the present invention, a method of interacting with a customer at a console includes displaying customer information to a worker on a worker display on a worker side of the console, displaying customer information to the customer on a customer-oriented display on a customer side of the console, and printing of documents for the customer on the worker side of the display.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A customer interaction console system for providing interaction between a worker and at least one customer, the system comprising:
   at least one counter module including a worker side and a customer side and a customer interaction area located between the customer side and the worker side, wherein the customer interaction console is configured to allow a customer on the customer side to face a worker on the worker side of the customer interaction console in a direct face-to-face arrangement across the customer interaction area, said counter module further including raised counter portions on each side of said customer interaction area such that said raised counter portions define said customer interaction area between said raised counter portions to allow the customer on the customer side and the worker on the worker side to view each other face-to-face across the customer interaction area and between said raised counter portions, at least one of said raised counter portions including an angled surface angled inward toward said customer interaction area;
  first and second panels located on each side of said counter module; and
  a customer-oriented display mounted to said angled surface of one of said raised counter portions of said counter module between said first and second panels and facing said customer side of said counter module, said customer-oriented display being angled to display information to a customer location at said counter module.

2. The customer interaction console system of claim 1 further comprising a worker display located on said worker side of said counter module.

3. The customer interaction console system of claim 1 further comprising a printer located on said worker side of said counter module.

4. The customer interaction console system of claim 1 wherein each of said first and second panels extends above and beyond said counter module.

5. The customer interaction console system of claim 4 wherein each of said first and second panels includes a translucent portion at least above said counter module.

6. The customer interaction console system of claim 1 further comprising a return module extending from one side of said counter module.

7. The customer interaction console system of claim 6 further comprising a printer integrated in said return module.

8. The customer interaction console system of claim 1 further comprising a chair pivotably mounted such that said chair is movable between a storage position and a user position.

9. A configurable customer interaction console system comprising:
  a plurality of counter modules;
  a plurality of panels configured to be positioned between said counter modules; and
  a plurality of wedge portions configured to receive said panels at either end of said wedge portions, each of said wedge portions including a first end and a second end narrower than the first end and a first side and a second side at an acute angle relative to the first side, said wedge portions being configured to be positioned between at least some of said counter modules with different orientations to form a plurality of configurations.

10. The customer interaction console system of claim 9 further comprising a customer-oriented information display mounted to at least one of said counter modules and facing a customer side, said customer-oriented information display being angled to display information to a customer location.

11. The customer interaction console system of claim 9 wherein each of said panels extends above and beyond said counter modules.

12. The customer interaction console system of claim 11 wherein each of said panels includes a translucent portion at least above said counter modules.

13. The customer interaction console system of claim 9 wherein at least some of the plurality of said counter modules comprise a customer interaction area and raised counter portions on each side of said customer interaction area.

14. The customer interaction console system of claim 13 further comprising a customer-oriented information display mounted to one of said raised counter portions on each of said counter modules and facing a customer side, said customer-oriented information display being angled to display information to a customer location.

15. The customer interaction console system of claim 9 further comprising at least one desk module configured to be positioned adjacent one of said panels.

16. A customer interaction console comprising:
  a counter module having a worker side and a customer side, said counter module comprising:
    a customer interaction area;
    raised counter portions on each side of said customer interaction area such that said raised counter portions define said customer interaction area between said raised counter portions to allow a customer on the customer side and a worker on the worker side to view each other face-to-face across the customer interaction area and between said raised counter portions, at least one of said raised counter portions including an angled surface angled inward toward said customer interaction area; and
    a customer-oriented display integrated with said angled surface of said one of said raised counter portions; and
  a return module extending from said counter module at an angle relative to said counter module.

17. The customer interaction console of claim 16 further comprising a printer located in said return module.

18. The customer interaction console of claim 16 further comprising an electronic signature pad located on said customer side of said counter module.

* * * * *